United States Patent [19]
Benoit et al.

[11] 4,214,811
[45] Jul. 29, 1980

[54] OPTICAL FIBRE CONNECTOR

[75] Inventors: Pierre A. Benoit, Boudry; Gilbert Widmer, Bienne, both of Switzerland

[73] Assignees: Ste. d'Exploitation des Cables Electriques, Systeme Berthoud, Borel & Cie., Cortaillod; S.A. des Cableries & Trefileries de Cossonay, Cossonay-Gare; Kabelwerke, Brugg A.G., Brugg, all of Switzerland

[21] Appl. No.: 938,257

[22] Filed: Aug. 30, 1978

Related U.S. Application Data

[63] Continuation-in-part of Ser. No. 816,204, Jul. 15, 1977, Pat. No. 4,183,616.

[30] Foreign Application Priority Data

Sep. 1, 1977 [CH] Switzerland ............. 10661/77

[51] Int. Cl.² .................................................. G02B 5/14
[52] U.S. Cl. .................................................. 350/96.21
[58] Field of Search .............. 350/96.20, 96.21, 96.22

[56] References Cited

U.S. PATENT DOCUMENTS

| 4,045,121 | 8/1977 | Clark | 350/96.21 |
| 4,088,386 | 5/1978 | Hawk | 350/96.21 |
| 4,102,561 | 7/1978 | Hawk et al. | 350/96.21 |

FOREIGN PATENT DOCUMENTS 2518319  7/1976  Fed. Rep. of Germany ........ 350/96.21

Primary Examiner—Stewart J. Levy
Attorney, Agent, or Firm—Cushman, Darby & Cushman

[57] ABSTRACT

An optical-fibre connector comprises a support piece 1, a first locking piece 2 and a second locking piece 3. Locking pieces 2 and 3 are respectively fixed to the support piece 1 by screws 4 and 5 which are engaged in cylindrical bores containing sleeve of elastomer material. The locking piece 2 comprises at its base two bearings 8 and 9. To connect two series of optical fibres, two identical connectors are disposed end to end and connected by two spindles 10 comprising a threading 11 which engages in a metallic sleeve 12 containing a sleeve 13, made of an elastomer material. This assembly permits absorption of vibrations and limitation of the clamping in order to avoid breaking of the optical fibre during use or connection of the two series of optical fibres.

8 Claims, 9 Drawing Figures

OPTICAL FIBRE CONNECTOR

This is a continuation-in-part of Application Ser. No. 816,204 filed on July 15, 1977, now U.S. Pat. No. 4,183,616.

The present invention relates to an improved optical-fibre connector for the connection of two groups of optical fibres provided with a sheath or protective coating and it more particularly relates to a connector of the type described in the prior main application mentioned above, which comprises:

An optical-fibre connector for the connection of two groups of optical fibres provided with a sheath or a protective coating, the connector comprising a support piece provided with longitudinal grooves, a first locking piece and means for fixing it over a part of the length of the grooves at the connector end remote from that at which the connection is to be made to thereby retain and lock the unstripped fibres in the corresponding part of the grooves, and a second locking piece and means for fixing it over a part of the length of the grooves at the connection end of the connector to thereby retain and lock the stripped fibres in the corresponding part of the grooves, the bottom of the support piece grooves having a V-shaped cross-section at the connection end of the connector and the second locking piece comprising in its corresponding end part a comb of longitudinal bars of a shape complementary to said grooves, these bars being of a material which is deformable by pressure exerted by the fixing means of the second locking piece on the optical fibres during locking.

Although such a connector provides quite remarkable results with regard to its attenuation and the alignment of the optical fibres, some alignment defects and rupture of the fibres have been noted when the connection is effected under difficult conditions, for example outside a laboratory.

According to the previous state of the art, the connector generally comprised only a single transverse bar. When this bar was slightly off-center or not properly positioned relatively to the compression grooves, the fibre disposed at the ends of the support piece could escape the action of this bar, which was a source of an alignment defect noted in certain cases.

In addition, when the locking pieces were set in place or two connectors were coupled, the screws or bolts were not always tightened in the same way. As a result, when the connectors were subjected to vibrations, it happened that one screw or another became loose. It is moreover noted that a tightening force which is too high leads to a clear increase of the losses, while a tightening force which is too low leads to rupture of the fibres.

The object of the present invention is to provide an improved optical-fibre connector whereby the drawbacks discussed above may be remedied.

To this end, an optical-fibre connector of the above-mentioned type, is provided according to the present invention with the improvements consisting of: the support piece comprising grooves of V shape over its whole length and being provided in its part for taking up the stripped fibres with at least two transverse grooves;

the first locking piece likewise comprising longitudinal grooves; the second locking piece comprising, over at least a part of the length of its part facing the support piece, a recess with houses a comb of longitudinal bars of deformable material with a form which is complementary to the grooves of the support piece; the comb of bars being provided with at least two removable transverse bars, provided with a device for limiting the forces of compression of the fibres, arranged so as to penetrate during assembly into said transverse grooves of the support piece;

the support piece comprising at least two cylindrical longitudinal bores housing two spindles for assembling two similar connectors; and screws for clamping the locking pieces onto the support piece and the spindles for assembling two similar connectors comprising a self-locking device for limiting the tightening force.

This improved connector provides numerous advantages with regard on one hand to making its component parts and on the other to its industrial use.

The present invention will be better understood with reference to an example of an embodiment and to the accompanying drawing, in which:

FIG. 1 is a sectional view of an embodiment of a connector according to the present invention, FIG. 2 is a perspective view of the piece for locking the stripped fibres of the connector according to FIG. 1, FIGS. 3 and 4 show two embodiments of the transverse bars of the locking piece shown by FIG. 2, FIG. 5 illustrates a mechanical device for pressing a bar against the stripped fibres, FIG. 6 shows a front view of another embodiment of a connector, FIG. 7 is a longitudinal sectional view along the line A—A of FIG. 6.

Figure 1:
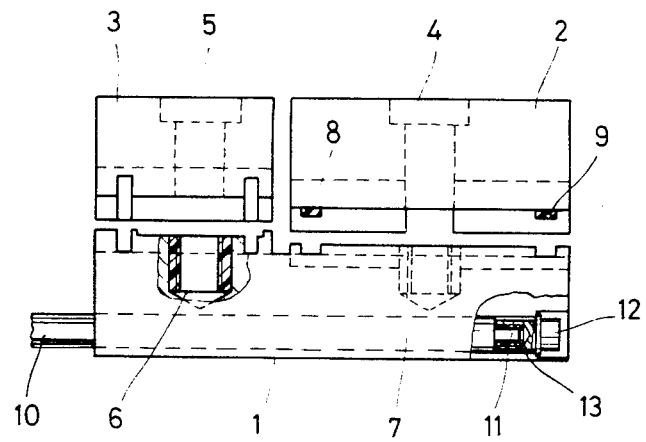

With reference to FIG. 1, the connector comprises three principal pieces, a support piece 1, a first locking piece 2 and a second locking piece 3 both fixed by the screws 4 and 5 to the support piece 1, as has been described in said prior main application.

The screws 4 and 5 are engaged in two cylindrical bores which may be traversing or not, which respectively contain two sleeves 6 and 7 of elastomer material thereby constituting a device for limiting the tightening force and absorbing vibrations.

The sleeves 6 and 7 are housed in a bore which may be recessed or traversing, provided for this purpose and are held in place therein simply by friction. When a screw is set in place, the sleeve thereby tends to turn in its housing when tightening is effected with a force surpassing a limit fixed in advance.

Said sleeves likewise have the role of absorbing vibrations which, in the connectors according to said prior main application, could loosen the locking screws if the latter were not tightened with the same force.

The locking piece 2 comprises at its base two bearings 8 and 9 for engagement in two transverse grooves of the support piece, in order to allow said locking piece to be centered and to absorb the vibrations of the latter while likewise avoiding exaggerated tightening of the locking screw 4. To connect two series of optical fibres, two connectors indentical to that of FIG. 1 are disposed end to end and connected by two spindles 10 housed in two corresponding bores which traverse the support piece 1 longitudinally. Each spindle comprises a threading 11 at its narrowed end, which engages in a metallic sleeve 12 containing a sleeve 13 made of an elastomer material. This assembly is effected for the same reasons, that is to say absorption of vibrations and limitation of clamping, already explained with reference to the description of the locking screws 4 and 5.

Figure 2:
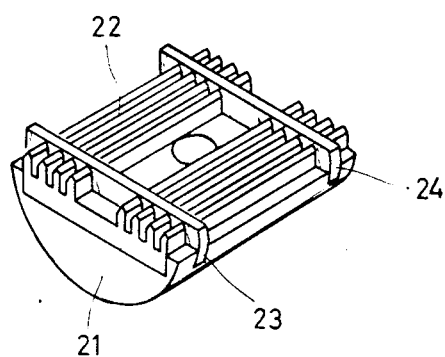

FIG. 2 is a perspective view which shows the second locking piece 3 provided for locking the stripped segments of the fibres onto their support. It consists of a lower metallic part 21 and an upper part 22 of thermoplastic material, for example plexiglass. This part 22 is composed of a longitudinally grooved block and of two transverse bars 23 and 24 having the role of ensuring that the stripped optical fibres are set in place in the grooves of the support piece during assembly of the connector. The longitudinal grooves are V-shaped and arranged to correspond to the V-shaped grooves of the support piece.

Figure 3:
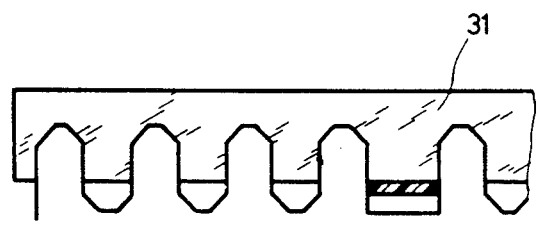
Figure 4:
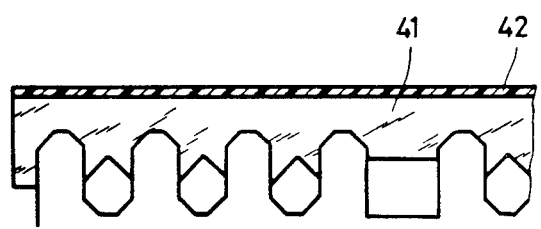

FIGS. 3 and 4 illustrate in detail two particular forms of bars 31 and 41. The bar 31 of FIG. 3 is a rectangular piece comprising in its central part a blade of elastomer material which facilitates its centering and plays the role of a spring when the locking piece 3 is set in place. This elastic blade allows the bar to be put forwards when mounting the fibres so that the latter are pushed towards the bottom of the V grooves of the support before their being finally set and locked in place. The bar 41 of FIG. 4 comprises a serie of V-shaped recesses opposed to the grooves of the support piece 1. Its upper edge is covered over its whole length with a layer 42 of an elastomer material which as previously explained puts the bar forwards during assembling so that the fibres are pre-positioned in the grooves.

Figure 5:
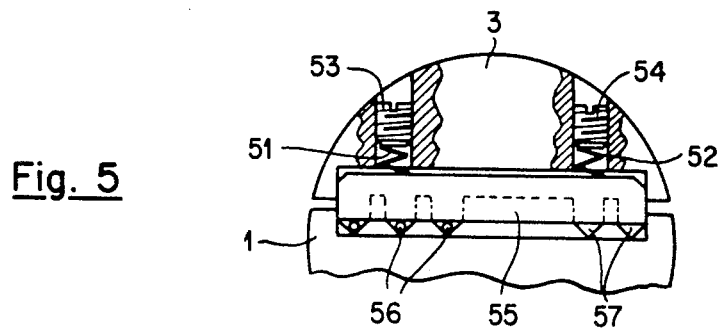

FIG. 5 shows a mechanical device consisting principally of two springs 51 and 52, retained by two imbus screws 53 and 54 housed in two bores of the locking piece 3 serving to lock the stripped fibre segments. The springs 51 and 52 exert a slight pressure force on the bar 55 so as to pre-position the fibres 56 at the bottom of the V grooves 57 of the support piece 1.

The connector shown by FIGS. 6 to 9 comprises as previously a support piece 61 having at its upper face a set of grooves 62 parallel to one another and to the longitudinal axis of the connector. The grooves 62 have a V-shaped profile and traverse two zones: A first zone 63 in which the V grooves have a relatively small depth for housing the stripped segments 64 of the optical fibres; a second zone 65 in which the V grooves are deeper for housing the sheathed fibre segments 66. An intermediate zone allows the zone 65 to be reached progressively from the zone 63 of less depth.

The support piece 61 comprises two cylindrical traversing bores 67 and 68 provided to house two spindles 69 and 70 which serve to allow two identical connectors to be joined end to end.

Figure 9:
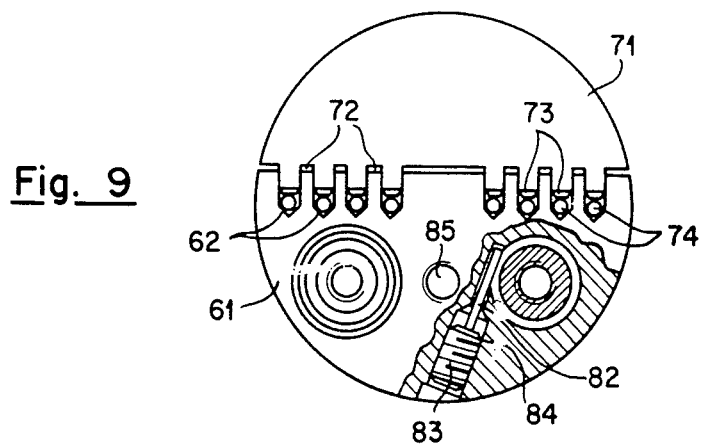
FIG. 9 is a transverse sectional view along the line C—C of FIG. 7.

The first locking piece 71, for locking the unstripped fibres in the V grooves of the zone 65, appears in cross-section in FIG. 9. It comprises at its base a serie of parallel grooves 72 of U shape separated by ridges 73 likewise of U shape for insertion into the upper part of the V grooves 62 of the support piece 61 to press on the sheathed fibres 74 and lock them at the bottom of said V grooves.

Figure 6:
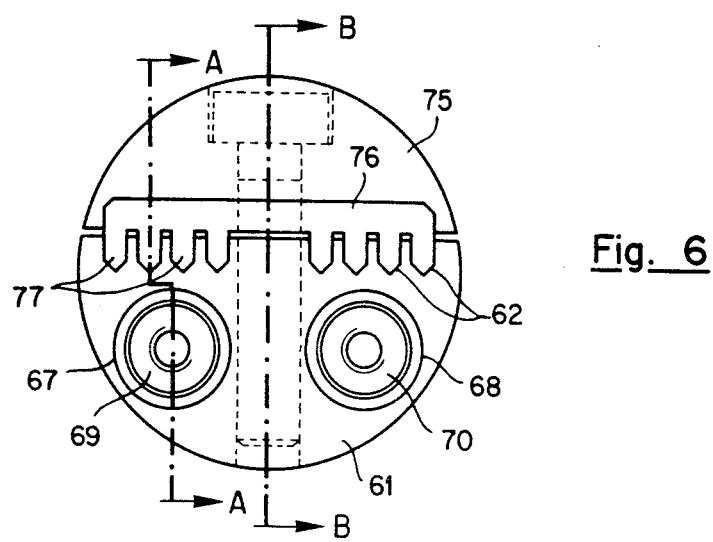
Figure 7:
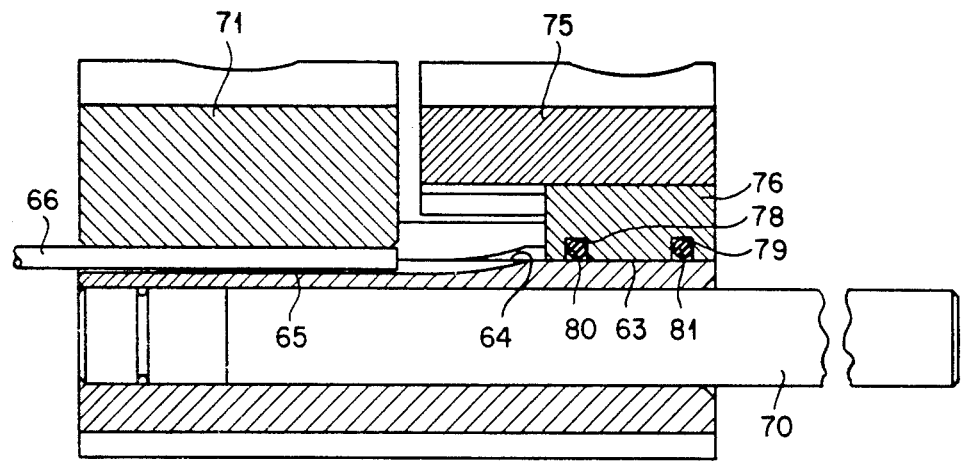

The second locking piece 75 illustrated in particular by the FIGS. 6 and 7, comprises at its base a cavity for housing a piece 76 of thermoplastic material, for example of plexiglass, having at its base a comb of bars 77 disposed longitudinally, the form of which is complementary to that of the grooves of the support piece in the zone 63. This comb of bars serves to lock the stripped segments 64 of the fibres at the bottom of the corresponding grooves 62.

The piece 76 is traversed from one side to the other by two transverse grooves 78 and 79 having a cross-section which is at least approximately square. Within these grooves two cylindrical bars 80 and 81 of elastomer material are housed, the diameter of which is slightly greater than the sides of the transverse groove, so that the segment of elastomer material is slightly compressed therein and projects from the groove so as to press against the stripped fibre and to ensure pre-positioning during assembly. This device allows the transverse bars described with reference to FIGS. 3 to 5 to be eliminated.

The two traversing spindles 69 and 70 are locked into position by means of a catch rod 82 mounted at the end of an imbus screw 83 and housed in a cavity 84, threaded in its upper part and bored in the support piece 61.

Between the two bores 67 and 68, housing the spindles 69 and 70, there is a threaded bore 85 which serves to ensure, in co-operation with a bolt (not shown), fastening of the connector to a support, in a casing, on an emitter or on a detector of light signals transmitted by the fibres.

Figure 8:
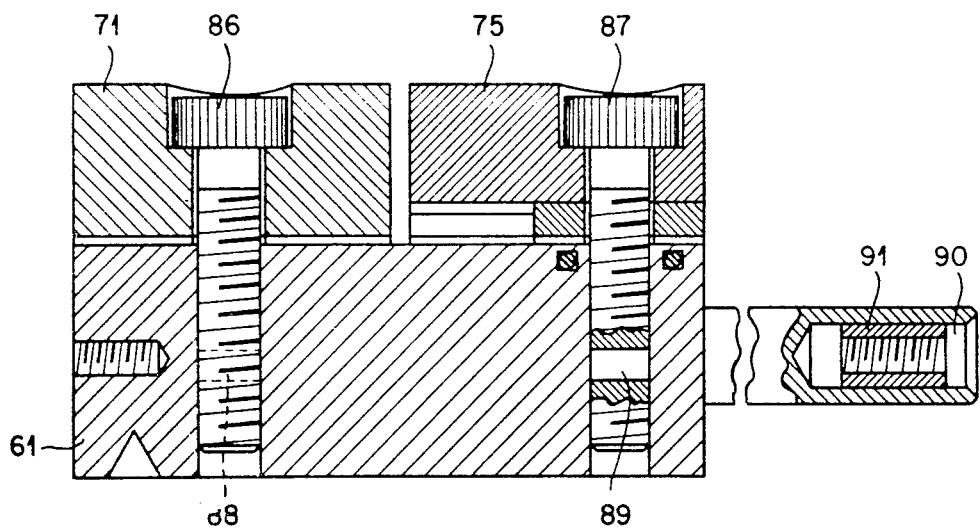
FIG. 8 is a longitudinal sectional view along the line B—B of FIG. 6.

FIG. 8 shows in more details the locking bolts 86 and 87 serving to respectively fix the locking pieces 71 and 75 on the support piece 61 and to lock the stripped and unstripped fibre segments in the corresponding grooves of the support. These bolts 86 and 87 are equipped with a braking device, for limiting the tightening force, consisting of the pins 88 and 89, of synthetic material, for example of delrin, and disposed across the bolts perpendicularly to their axis.

For fixing two identical connectors end to end, two bolts 90 are used, which are screwed in axially at the end of the spindles 69 and 70. To prevent these bolts from being irregularly tightened during assembly, which would give rise to defects in the alignment of the fibres, it is provided to introduce a sleeve 91 of synthetic material, for example of delrin, in a bore specially arranged for this purpose at the end of said spindles. This sleeve is introduced by force into its housing and adheres to its walls simply by friction. When a fitter screws in the bolt too hard, the sleeve absorbs the force in excess by turning on itself in its bore. This device constitutes a limiter of the tightening force.

The assembly and use of the described connectors are indentical with those of said prior main application. The security in use and the quality of the results are however superior.

It is to be noted in particular that these connectors allow the advantages to be fully exploited which result from the fact that the fixation of the cable, as a whole, is ensured by different means than those which permit the individual fixation of the sheathed fibres, on one hand, and of the stripped fibres, on the other hand.

What is claimed is:

1. An optical-fibre connector for the connection of two groups of optical fibres provided with a sheath or a protective coating, the connector comprising a support piece provided with longitudinal grooves, a first locking piece and means for fixing it over a part of the length of the grooves at the connector end remote from that at which the connection is to be made to thereby retain and lock the unstripped fibres in the corresponding part of the grooves, and a second locking piece and means for fixing it over a part of the length of the grooves at the connection end of the connector to thereby retain and lock the stripped fibres in the corresponding part of the grooves, the bottom of the support piece grooves having a V-shaped cross-section at the connection end of the connector and the second locking piece comprising in its corresponding end part a comb of longitudinal bars of a shape complementary to said grooves, these bars being of a material which is deformable by pressure exerted by the fixing means of the second locking piece on the optical fibres during locking, the connector further comprising the improvements consisting of:

- the support piece comprising grooves of V shape over its whole length and being provided in its part for taking up the stripped fibres with at least two transverse grooves;
- the first locking piece likewise comprising longitudinal grooves;
- the second locking piece comprising, over at least a part of the length of its part facing the support piece, a recess which houses a comb of longitudinal bars of deformable material with a form which is complementary to the grooves of the support piece;
- the comb of bars being provided with at least two removable transverse bars, provided with a device for limiting the forces of compression of the fibres, arranged so as to penetrate during assembly into said transverse grooves of the support piece;
- the support piece comprising at least two cylindrical longitudinal bores housing two spindles for assembling two similar connectors;

and screws for clamping the locking pieces onto the support piece and the spindles for assembling two similar connectors comprising a self-locking device for limiting the tightening force.

2. A connector according to claim 1, wherein said transverse bars are in the form of a thin rectangular plate with rectangular cross-section.

3. A connector according to claim 2, wherein said bars comprise at their bottom edge a serrated segment having each hollow with an inverted V shape corresponding to the V-shaped hollow of one of the longitudinal grooves of the support piece.

4. A connector according to claim 2, wherein said bars comprise on the central part of their bottom edge a zone covered with an elastomer material.

5. A connector according to claim 2, wherein said bars are covered over the entire length of their upper edge with a layer of elastomer material.

6. A connector according to claim 2, further comprising a spring mechanism which bears against said transverse bars so that these project beyond the end of the grooves in which they are housed in order to ensure pre-positioning of the fibres during their assembly on the connector.

7. A connector according to claim 1, wherein said bars consist of a cylindrical segment of an elastomer material and are housed in grooves with at least approximately square cross-section.

8. A connector according to claim 1, wherein the clamping screws and the assembling spindles are respectively engaged in sleeves of synthetic material provided in the corresponding bores to thereby constitute said self-locking device.

* * * * *